June 29, 1954   J. E. ROBERTS   2,682,428
LAWN SEEDER
Filed Dec. 13, 1951
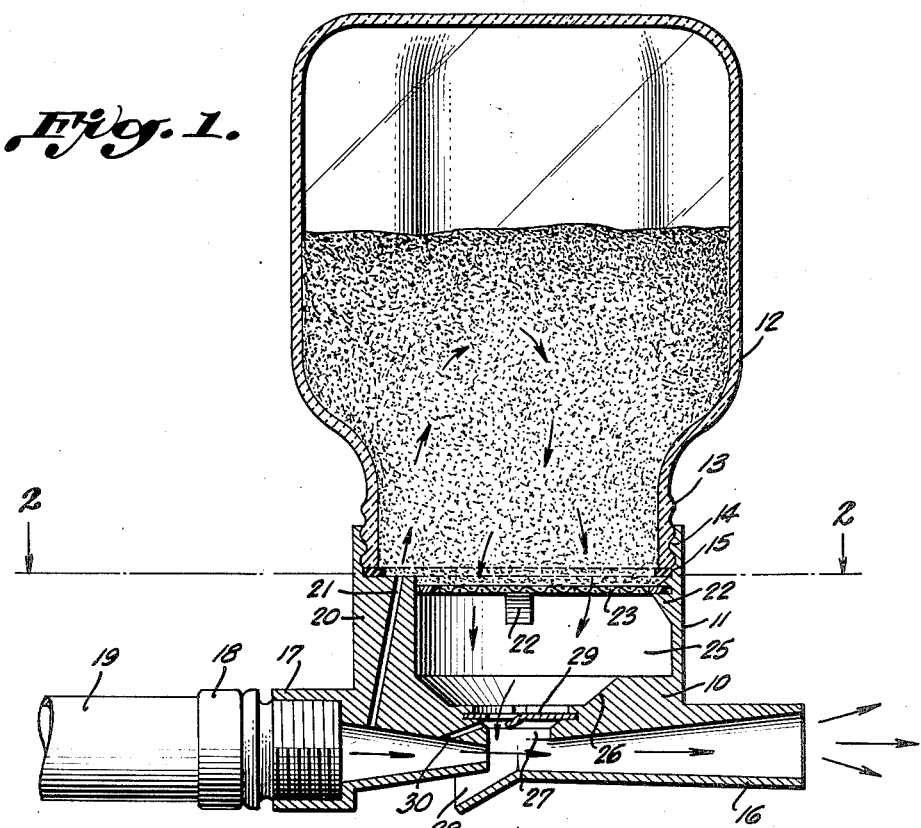
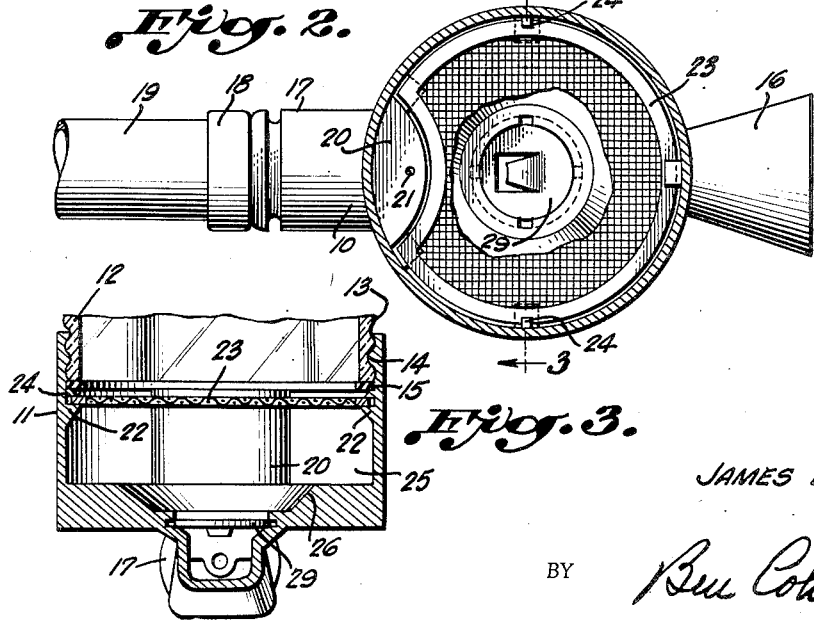
INVENTOR
JAMES E. ROBERTS
BY *Ben Cohen*
ATTORNEY Patented June 29, 1954

2,682,428

UNITED STATES PATENT OFFICE 2,682,428

LAWN SEEDER

James E. Roberts, Washington, D. C.

Application December 13, 1951, Serial No. 261,519

5 Claims. (Cl. 299—84)

The present invention relates to a lawn seeding device but more in particular to a device of this character adapted to evenly distribute grass seed on lawns or small plots of ground.

In the care of lawns, it is often desirable to add grass seed to certain portions of the lawn where the grass is thin or it may be desired to grow new grass on a bare plot of ground. Heretofore, the common method of distributing grass seed is by sifting it through one's fingers. Because of the minute size of the grass seed, it is impossible to spread the seed evenly.

The present invention contemplates a novel nozzle structure adapted to be attached to a conventional garden hose, said structure adapted to receive a container, preferably a conventional Mason jar in which the seed is uniformly mixed with water and from which the seed is dispensed in the form of a spray utilizing the water passing through the garden hose. As a result of my novel device, the seed is spread evenly and uniformly and the amount of seed dispensed can be readily controlled.

A further feature of the present invention resides in the fact that the seed can be partially germinated prior to spreading. This is accomplished by placing the seeds in a number of jars filled with water for a period of time depending upon the type of seed sown, and thereafter connecting each of the jars to my novel seeding device as previously described and spraying the germinated seeds onto the lawn.

A further object and advantage of the present invention resides in the economy effected in the amount of seed required to produce a well seeded lawn. It has been found from actual experience that only a third of the seed is required with the present device as compared to sowing by the dry method.

A still further object of the invention is to provide a lawn seeder which is simple in construction, inexpensive to manufacture, effective in operation, and which can easily and effectively be used by anyone.

Further objects and advantages of the present invention will appear from the following detailed description taken in connection with the accompanying drawing showing a preferred embodiment of the invention, wherein:

Figure 1 is a vertical sectional view of the device of the present invention shown attached to one end of a conventional garden hose;

Figure 2 is a horizontal section through the same taken on the line 2—2 of Figure 1; and Figure 3 is a partial vertical section taken on the line 3—3 of Figure 2.

Referring to the drawing, the lawn seeder hereinbefore referred to comprises a generally tubular conduit portion 10 and a threaded cap portion 11 which may be formed by a casting operation of suitable rust-proof material. The cap portion 11 serves as a closure member for the container 12 which may constitute a conventional Mason jar. The jar is threaded at 13 to cooperate with the internal threads 14 on the cap portion, and a rubber gasket 15 is provided to produce a water tight connection.

The tubular portion 10 is provided at its forward end with a nozzle portion 16 and at its rear with a threaded coupling portion 17 for connecting the device to the conventional threaded coupling 18 of a garden hose 19. The cap portion 11 comprises a cylindrical portion and has a semi-cylindrical portion 20 merging with the tubular portion 10. A passage 21 is provided in wall portion 20 through which water passes from the hose to the interior of the jar.

The interior wall of the cap member is provided with a plurality of lugs 22 providing shoulders for supporting a screen member 23. As seen in Figures 2 and 3, the lugs 24 are smaller than lugs 22 and have inclined upper surfaces. The screen member 23 is formed of thin flexible material permitting the screen to be snapped past the lugs 24 whereby the screen is held in position on the lugs 22. The screen is removed by merely flexing the screen in order that the sides of said screen may be withdrawn from the locking lugs. The screen member prevents the seed in the jar from passing into the mixing chamber too rapidly.

The lower internal wall of the cap member is reduced in cross-section by an annular ledge 26 forming an air chamber 27. Air is admitted to said air chamber through vent opening 28. Suitable provision is made in the passage from the mixing chamber to the nozzle 16 for supporting a diffuser member 29. A passage 30 permits a stream of water to enter the mixing chamber 25 to increase the proportion of water to seed. Although not specifically shown, it will be clear that the seeder can be cast in two complementary parts for ease in manufacture and assembly.

In operation, the nozzle of the conventional garden hose is removed and the above described mixing unit substituted therefor. The Mason jar which may contain the dry seed or where it is desired to partially germinate the seed, a mixture of the seed and water, is mounted on the mixing unit and the unit held with the jar in inverted position. When the faucet feeding the garden hose is opened, and water is made to discharge through the nozzle, a portion of the water will pass through the bore of the nozzle with a portion of the water passing into the jar through the passage 21, and some water passing through the passage 30 into the mixing chamber 25. After the jar is filled with water, the mixture of seed and water will pass through the screen 23 into the chamber 25 where additional water is added to the mixture. The mixture then passes through the diffuser 29, into the air chamber 27 where air is added to the mixture through the vent opening 28 and the resultant mixture joins the major portion of water passing through the bore. The resultant mixture comes out of the nozzle 16 as a spray of seed and water. By proper control of the spray, the operator can evenly spread the grass seed over any desired portion of the lawn.

In dispensing very fine seed, such as bent grass seed, the jar is held in an upright position instead of an inverted position in order that the seed may flow slowly. The main principle of the invention resides in the provision of means for dispersing grass seed easily and evenly by means of a spray of water.

From the foregoing description, it is readily apparent that the present apparatus is well adapted to accomplish the objects and advantages set forth. It is obvious that minor changes may be made in the details of construction and design of the above described embodiment of the invention without departing from the spirit thereof, such changes being restricted only by the scope of the following claims.

Having thus described the invention, what is claimed is:

1. In a device for sowing grass seed, a tubular member having a nozzle at one end and a coupling at its other end for attachment to a source of water under pressure, a cylindrical portion extending from said tubular member for forming a mixing chamber, means provided at the upper end of the cylindrical portion for detachably receiving a container, a screen positioned at the upper end of the cylindrical portion, said screen having mesh of such size as to permit the passage of grass seed, a diffuser member positioned at the lower end of the cylindrical portion, and an air inlet formed in said tubular member.

2. A device of the character described in claim 1, and a passageway formed in said cylindrical member extending from the tubular member to a point above the screen.

3. A device of the character described in claim 2, and a second passageway formed in the cylindrical portion extending from the tubular member to the mixing chamber.

4. A device for sowing grass seed comprising a tubular member having a nozzle at one end and a coupling at its other end for connection to a source of water under pressure, a mixing chamber above said tubular member, said mixing chamber having means thereon for receiving a grass seed container, a screen positioned at the upper end of the mixing chamber and having a mesh of such size as to permit the passage of grass seed, a diffuser member positioned at the lower end of the mixing chamber, and an air inlet formed in said tubular member.

5. A device of the character described in claim 4, and a passageway extending from the tubular member to a point above the screen.

References Cited in the file of this patent

UNITED STATES PATENTS

| Number | Name | Date |
|---|---|---|
| 478,157 | Eastman | July 5, 1892 |
| 1,176,126 | Benedict | Mar. 21, 1916 |
| 2,006,967 | Sparks | July 2, 1935 |
| 2,142,947 | Kretzschmar | Jan. 3, 1939 |
| 2,589,595 | Aske | Mar. 18, 1952 |
| 2,601,672 | Gatchet | June 24, 1952 |